United States Patent [19]
Becker-Irvin et al.

[11] Patent Number: 5,861,738
[45] Date of Patent: Jan. 19, 1999

[54] DC TO DC CONVERTER WITH A SINGLE-FAULT TOLERANT CLAMP

[75] Inventors: Craig H. Becker-Irvin, Redondo Beach; Kin E. Shum, Los Angeles, both of Calif.

[73] Assignee: Hughes Electronics Corporation, El Segundo, Calif.

[21] Appl. No.: 969,600

[22] Filed: Nov. 13, 1997

[51] Int. Cl.[6] .................................................. G05F 1/40
[52] U.S. Cl. ........................... 323/282; 323/223; 363/56
[58] Field of Search .................................. 323/222, 223, 323/282; 363/21, 56

[56] References Cited

U.S. PATENT DOCUMENTS

| | | | |
|---|---|---|---|
| 4,420,700 | 12/1983 | Fay et al. | 323/282 |
| 4,928,200 | 5/1990 | Redl et al. | 363/56 |
| 5,365,420 | 11/1994 | Cadman | 363/50 |
| 5,532,626 | 7/1996 | Khayat | 323/282 |
| 5,594,325 | 1/1997 | Manner | 323/282 |
| 5,691,627 | 11/1997 | Shum | 323/222 |

*Primary Examiner*—Stuart N. Hecker
*Attorney, Agent, or Firm*—Georgann S. Gruneba; M. W. Sales

[57] ABSTRACT

A single-fault tolerant DC-to-DC converter having an output voltage clamp is capable of sourcing current to and sinking current from a load while maintaining a well regulated secondary bus voltage $V_{bus}$. The clamp is disabled when the DC-to-DC converter is sourcing current so that all of the current is delivered to the load and is enabled when $V_{bus}$ exceeds a clamp set point voltage $V_{clamp}$ to sink the excess current and clamp $V_{bus}$ at $V_{clamp}$. To provide single fault tolerance, the clamp includes a fault detection clamp element that is controlled by the DC-to-DC converter so that they operate mutually exclusively and a regulator clamp element whose resistance is set in a negative feedback control loop so that, when the fault protection clamp element is activated, both clamp elements sink the excess current and control the secondary bus voltage.

26 Claims, 5 Drawing Sheets

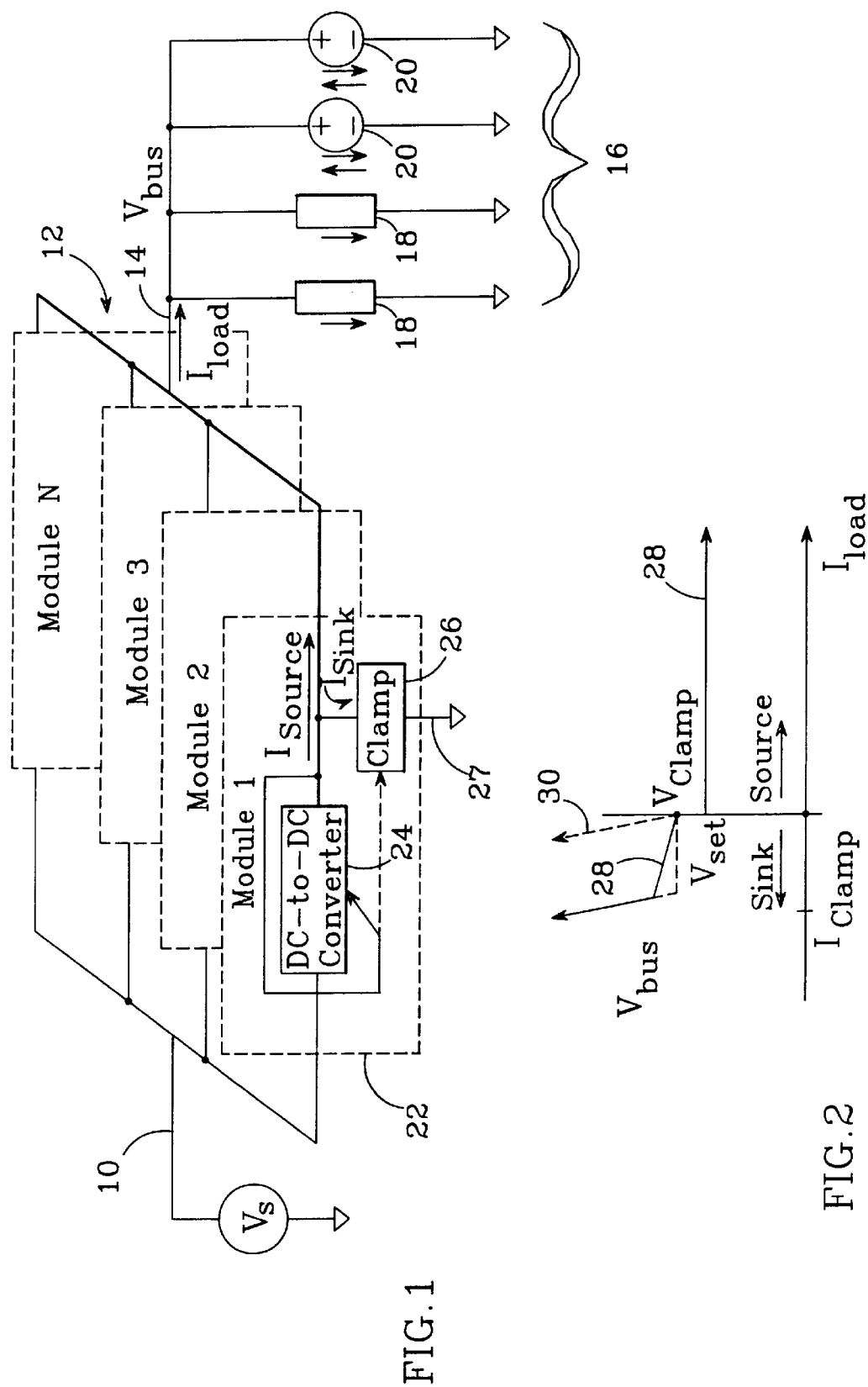

DC TO DC CONVERTER WITH A SINGLE-FAULT TOLERANT CLAMP

BACKGROUND OF THE INVENTION

1. Field of the Invention

This invention relates to DC-to-DC converters and more specifically to a DC-to-DC converter having a single-fault tolerant clamp for sinking excess current generated by motor-generator loads.

2. Description of the Related Art

Electrical systems typically have a primary bus that provides a well regulated supply voltage. Often times, this voltage is generated externally and routed to the primary bus. Alternately, the primary voltage may be generated on board the particular electrical system. For example, spacecraft employ large solar arrays to generate the supply voltage.

These electrical systems typically include a variety of subsystems, i.e. loads, that operate from different supply voltages. Therefore, the primary voltage must be converted to one or more secondary supply voltages, which should exhibit minimal ripple and be insensitive to changes in load current. The mechanism for making this conversion is called a DC-to-DC converter, which receives the primary voltage and sources current to supply the load connected to a particular secondary bus while regulating the secondary bus voltage. If the bus voltage should fall too low, one or more of the loads may degrade or turn off completely. Similarly, if the bus voltage should increase too much, one or more of the loads may become damaged.

One type of DC-to-DC converter is called a switching regulator. A transistor operated as a saturated switch periodically applies the full primary voltage across an inductor for short intervals. As the inductance builds up, energy is stored in the inductor's magnetic field and then transferred to a filter cap that smooths the secondary bus voltage. An error amplifier compares the secondary bus voltage to a set point voltage and outputs a voltage control signal. The control signal is compared to a ramp voltage, which incorporates the present amount of source current, to control the pulse width that is applied to the transistor.

The pulse width determines the amount of current sourced by the switching regulator to regulate the secondary bus voltage. As a result, when the loads collectively demand additional current the bus voltage dips temporarily, which causes the control loop to drive the regulator harder to source more current and pull the bus voltage up to the set point. Similarly, when the loads collectively demand less current the bus voltage rises temporarily which reduces the control signal causing the switching regulator to source less current and maintain regulation. The well known "fly-back" topology is one type of switching regulator that is simple, low power and provides excellent primary-to-secondary bus isolation.

In any given application, a particular secondary bus may supply a number of loads such as amplifiers that exclusively consume power, i.e. sink current. A motor-generator type load such as a reaction wheel used for satellite attitude control or momentum wheels consumes power (sinks current) from the secondary bus when motor speed is increasing and generates power (sources current) when motor speed is reduced. Systems that include motor-generator type loads have the potential of imparting energy back into the DC-to-DC converter, which would cause the secondary bus voltage to increase rapidly. This may cause electrical overstress to other loads connected to the secondary bus.

To avoid this potentially catastrophic problem, known bus architectures are designed such that the maximum sourcing capacity of the motor-generator type loads is less than the fixed amount of current sunk by other loads. Thus, as the motor-generator loads source more current, the DC-to-DC converter can reduce the amount of current it sources thereby maintaining a proper current balance and regulating the secondary bus voltage. If this design criteria were violated and if the total current sourced by the motor-generator loads were to exceed the total current sunk by the other loads then, since the most known DC-to-DC converters can do is to stop sourcing current, the excess current would be driven back into the output of the DC-to-DC converter causing the secondary bus voltage to increase.

SUMMARY OF THE INVENTION

In view of the above problems, the present invention provides a single-fault tolerant DC-to-DC converter which has the capability of sourcing and sinking current at a secondary bus to regulate the bus voltage.

This is accomplished by connecting a clamp between the secondary bus at the output of the DC-to-DC converter and preferably ground. The clamp is disabled when the secondary bus voltage is less than a bus set point voltage so that all of the current sourced by the DC-to-DC converter is delivered to the load. Conversely, when the secondary bus voltage exceeds a clamp set point voltage the clamp is enabled so that it sinks excess current generated by the motor-generator loads and clamps the secondary bus voltage at the clamp set point voltage.

In the preferred embodiment, the clamp includes a fault-protection clamp element that is connected to the secondary bus, a comparator that disables the fault protection clamp element when the DC-to-DC converter is sourcing current, a regulator clamp element having a variable resistance that is connected in series with the fault protection clamp element, and a sink error amplifier that senses the secondary voltage, compares it to the clamp set point voltage and sets the regulator clamp element's resistance to sink the excess current sourced by the motor-generator load when the fault protection clamp is activated. This architecture is single fault tolerant in that a single component failure will not cause the converter to simultaneously sink and source current.

Furthermore, the fault protection clamp element preferably establishes an offset voltage equal to approximately one half the secondary bus voltage so that the fault protection and regulator clamp elements equally share power dissipation. In the preferred architecture, a plurality of converter modules would be connected in parallel between the primary and secondary buses to share the current sourcing and sinking requirements. Due to processing variations, the clamp set point voltages in the modules will differ slightly. To ensure that the modules share the excess current generated by the motor-generator loads, sink current is sensed and fed back to the sink error amplifier to effectively increase its clamp set point voltage. This shifts the secondary bus voltage up to the new clamp set point voltage, which tends to further activate other ones of the modules so that they sink an increasing portion of the excess current.

The sensed current is also used to control a current clamp that causes the secondary bus voltage to increase when the sink current flowing through the clamp exceeds a limit. The system quickly compensates for the voltage increase by causing the remaining modules to sink a higher percentage of the total sink current.

These and other features and advantages of the invention will be apparent to those skilled in the art from the following detailed description of preferred embodiments, taken together with the accompanying drawings, in which:

BRIEF DESCRIPTION OF THE DRAWINGS

FIG. 1 is a block diagram of a plurality DC-to-DC converter modules connected in parallel between primary and secondary buses to source current to and sink current from a plurality of motor-generator and other loads while maintaining a regulated secondary bus voltage;

FIG. 2 is a plot of the secondary bus voltage versus the load current;

DETAILED DESCRIPTION OF THE INVENTION

Figure 3:
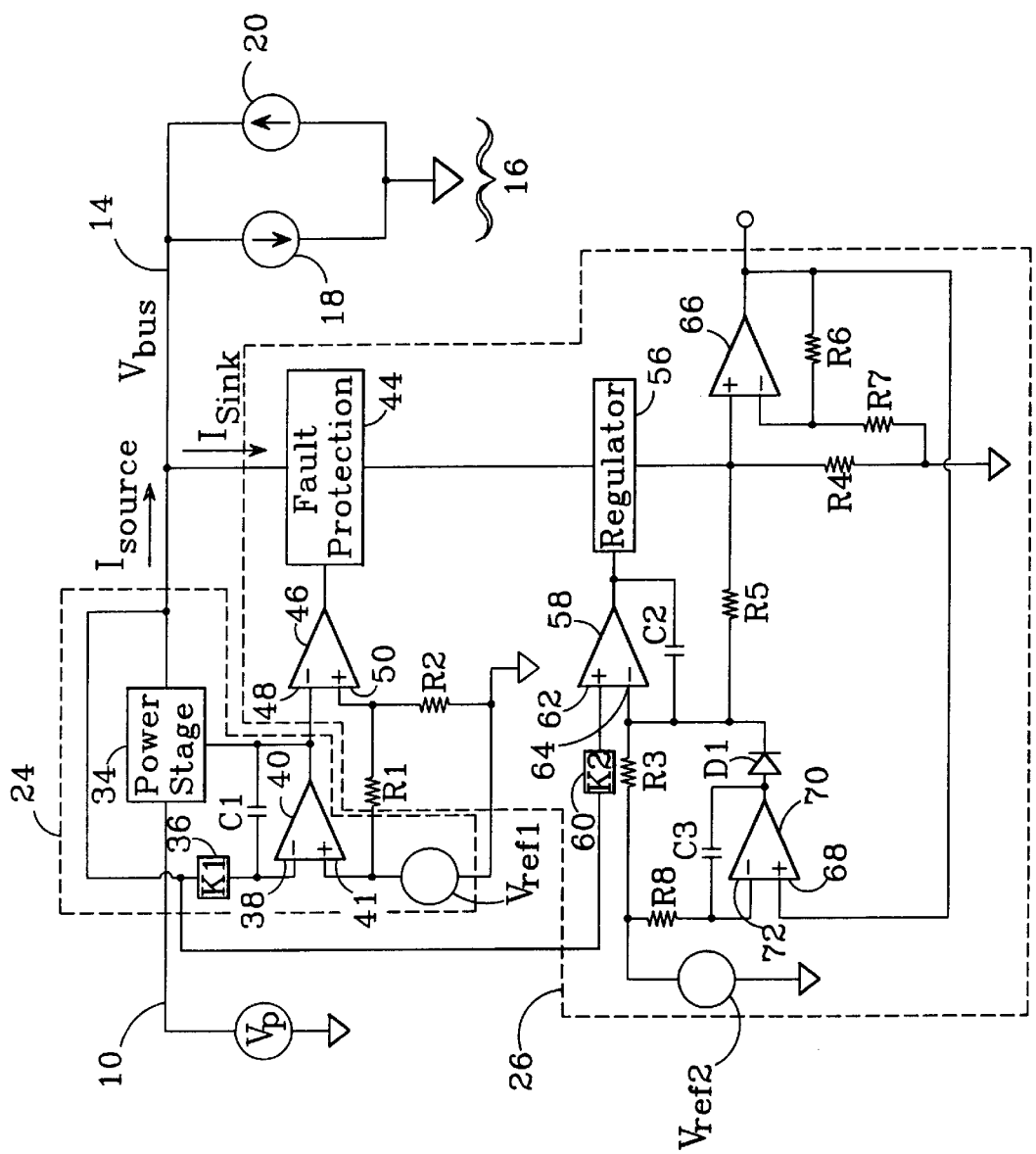
FIG. 3 is a simplified schematic diagram of a single-fault tolerant DC-to-DC converter that is capable of sourcing and sinking load current.

The present invention provides a clamp for use with a DC-to-DC converter which allows the converter to sink as well as source current. Each clamp is preferably single-fault tolerant in that a single component failure will not cause the converter to both sink and source current simultaneously. Furthermore, when sinking excess load current produced by the motor-generator loads, the system preferably distributes power between a plurality of converter modules connected in parallel between primary and secondary buses and further distributes power within each module between fault protection and regulator clamp elements.

As shown in FIG. 1, a typical voltage bus architecture will have a primary bus 10 that distributes a well regulated source voltage $V_s$, generated either externally or internally, to one or more DC-to-DC converter banks 12. Each converter bank 12 sources or sinks current via a secondary bus 14 to a load 16 while regulating the secondary bus voltage $V_{bus}$. The load 16 may include one or more loads 18 that exclusively consume power (sink current) and/or one or more motor-generator loads 20 such as reaction wheels used to satellite attitude control that consume power (sink current) when motor speed is increasing and generate power (source current) when motor speed is decreasing. As a result, load 16 may be capable of sourcing current back to the converter bank 12 as well as sinking current.

Each converter bank 12 includes one or more converter modules 22 that are connected in parallel share the current sourcing and sinking requirements. Multiple modules increase both the current sourcing and sinking capacity of the bank and distribute the thermal energy throughout the system. Each module 22 includes a DC-to-DC converter 24 that sources current to secondary bus 14 to establish the secondary bus voltage $V_{bus}$ when the current sourced by motor-generator loads 20 is less than the fixed amount of current sunk by other loads 18. Converter 24 senses the secondary bus voltage $V_{bus}$ and compares it to a bus set point voltage $V_{set}$ to generate a voltage control signal that controls the amount of current sourced by the DC-to-DC converter and thereby regulate $V_{bus}$.

An output voltage clamp 26 is connected between secondary bus 14 and preferably ground 27. Clamp 26 is preferably single-fault tolerant in that a single component failure will not cause it to sink current generated by DC-to-DC converter 24. Clamp 26 is disabled by the converter's voltage control signal when $V_{bus}$ is less than the bus set point voltage so that all of the current generated by the DC-to-DC current is delivered to load 16. Clamp 26 is enabled when $V_{bus}$ exceeds a clamp set point voltage $V_{clamp}$, which is greater than the bus set point voltage $V_{bus}$, to sink the excess current $I_{sink}$ generated by load 20 and clamp $V_{bus}$ at the clamp set point voltage $V_{clamp}$.

In addition, because the modules clamp set point voltages differ due to processing variations, the sink current is fed back to increase the bus voltage and further activate the remaining modules to share the total sink current. The controlled increase in bus voltage is not large enough to disrupt or damage the other loads 18 or motor-generator loads 20. However, if a module 22 sinks too much current, clamp 26 causes the bus voltage to increase turning the other modules on harder and causing them to sink any additional current.

FIG. 2 is a plot of the secondary bus voltage $V_{bus}$ 28 versus the current $I_{load}$. When DC-to-DC converter is sourcing current, the secondary bus voltage is held at approximately the bus set point voltage $V_{set}$. The secondary bus voltage may temporarily dip or increase in response to changes in the load, but will quickly return to the set point voltage. If the clamp were omitted, the secondary bus voltage would increase very rapidly as shown by dashed line 30 when the load delivers excess current back into the DC-to-DC converter, thus degrading and possibly damaging the individual loads. By diverting the excess current to ground, the clamp prevents the bus voltage from increasing to an unacceptably high voltage.

The clamp could clamp the secondary bus voltage at the bus set point voltage $V_{set}$, however, to provide the single-fault tolerant feature the clamp (as shown in detail in FIG. 3) includes a fault protection clamp element that is activated at the bus set point voltage $V_{set}$ and a regulator clamp element that is activated at the clamp set point voltage $V_{clamp}$. Furthermore, the shift in the bus voltage will further turn on other ones of the converter modules to share the sink current. Current sharing is further facilitated by increasing the bus voltage 28 in a controlled manner as the sink current through a particular clamp increases. Alternately, the bus voltage may be maintained at the clamp set point voltage regardless of the amount of sink current. This may be preferable when only a single converter module is used. When the current sunk by a particular clamp exceeds a maximum value $I_{clamp}$, the motor-generator current sourcing loads force $V_{bus}$ to increase rapidly thereby forcing the remaining modules on harder to sink any additional source current.

Figure 4:
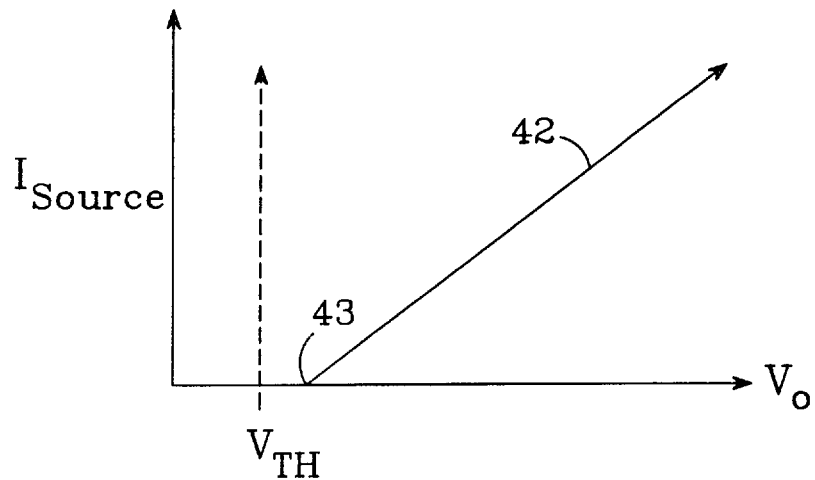
FIG. 4 is a plot of the source current produced by the DC-to-DC converter versus the output voltage of the bus voltage error amplifier.

As shown in FIG. 3, each converter module's DC-to-DC converter 24 includes a power stage 34 such as the well known "fly back converter" that is connected between the primary and secondary buses 10 and 14, respectively, that sources current to load 16 to regulate the voltage on secondary bus 14. The bus voltage is fed back through a bias network 36 such as a voltage divider to the inverting input 38 of a bus voltage error amplifier 40 that includes an integrating capacitor C1. The error amplifier compares the bus voltage to the bus set point voltage at its non-inverting terminal 41, which is set by a reference voltage source $V_{ref1}$, to modulate the voltage control signal $V_0$ that controls the amount of source current 42 produced by power stage as shown in FIG. 4. For small voltage control signals below a "knee" 43, the source current 42 is zero. At higher voltage levels, the source current 42 increases proportional to the voltage control signal.

In this negative feedback configuration, the bus voltage error amplifier 40 does whatever is necessary in the way of causing the converter to source current to force the voltages at its inverting and non-inverting inputs to be the same. Thus, if the secondary bus voltage momentarily dips due to an increase in current demand from load 16, the voltage at the inverting terminal will be less than the bus set point voltage causing the amplifier to increase the voltage control signal which when compared to the ramp voltage inside power stage 34, will control the pulse width modulation of the power stage to source more current and pull up the secondary bus voltage. Conversely, if the secondary bus voltage should exceed the bus set point voltage, the error amplifier 40 will reduce the voltage control signal causing the power stage 34 to back off on the amount of source current and pull down the secondary bus voltage. Only when power stage 34 has turned off and the bus voltage still exceeds the set point voltage will clamp 26 take over and sink the excess current to ground thereby clamping $V_{bus}$, at least initially, at the clamp set point voltage.

To provide single-fault tolerance, clamp 26 preferably includes a fault-protection clamp element 44 that is connected to secondary bus 14. A comparator 46 compares the bus voltage error amplifier's voltage control signal $V_0$ at its inverting terminal 48 to a threshold voltage $V_{TH}$ at its non-inverting terminal 50 to enable/disable fault protection clamp element 44 such that it is activated only when power stage 34 is not sourcing current. This mutually exclusive operation prevents clamp 26 from sinking current produced by the power stage. Series connected resistors R1 and R2 are connected in parallel with reference voltage $V_{ref1}$ with their midpoint connected to the comparator's non-inverting input 50 to define a voltage divider that sets the threshold voltage at a point below the knee 43 in the error amplifier's response curve shown in FIG. 4.

Clamp 26 also includes a regulator clamp element 56 connected in series with fault protection clamp element 44. Regulator clamp element 56 exhibits a variable resistance that can be controlled to sink more or less current as load 16 changes. A sink error amplifier 58 that includes an integrating capacitor C2 senses the secondary bus voltage through a bias network 60 such as a voltage divider at its non-inverting terminal 62 and compares it to a clamp set point voltage $V_{clamp}$, which is set by a voltage source $V_{ref2}$ and a bias resistor R3 connected in series at its inverting terminal 64. Amplifier 58 produces a voltage signal that sets the regulator clamp element's resistance to sink the excess current and clamp the secondary bus voltage at the clamp set point voltage.

Similar to bus voltage error amplifier 40, sink error amplifier 58 will produce whatever voltage signal is necessary to adjust the amount of current flowing through fault protection and regulator clamp elements 44 and 46 such that the secondary bus voltage sensed at its non-inverting terminal is approximately equal to the set point voltage at its inverting terminal. To allow current sensing, a resistor R4 is preferably connected in series with regulator clamp element 56 to ground.

Resistor R4, and more precisely the voltage across resistor R4, can be used to sense the amount of current being sunk by clamp 26. This information can be used to control the secondary bus voltage to enhance current sharing among the different converter modules, to provide telemetry data about the different load components, and to clamp the load current flowing through any one clamp. To control the secondary bus voltage during clamping, a feedback resistor R5 is connected between the top of sense resistor R4 and the inverting terminal 64 of sink error amplifier 58. As a result, the voltage at the inverting terminal and hence the secondary bus voltage increases proportionately to the sensed current. Specifically, the secondary bus voltage increases with slope M=((R3×R5)/(K2×(R3+R4))) volts/ampere where K2 is the bus voltage feedback ratio. The increase in the secondary bus voltage will tend to further activate other converter modules whose clamp set point voltages may be higher than the current modules thereby distributing power dissipation among the several modules.

Current limiting is employed to protect the individual clamp modules 26 and to monitor module sink current. A DC amplifier 66 amplifies the voltage across current sense resistor R4, which is fed back to the non-inverting input 68 of an error amplifier 70 that includes an integrating capacitor C3 and is also available for inclusion in the telemetry data as an indicator of $I_{sink}$. Bias resistors R6 and R7 are connected in series between the DC amplifier's output and ground with their midpoint being connected to the amplifiers inverting input.

Error amplifier 70 compares the fed back voltage to a reference voltage at its inverting input 72 that corresponds to a maximum desired current $I_{clamp}$. A resistor R8 is connected between voltage supply $V_{ref2}$ and the inverting input 72 to set the reference voltage. A switchable voltage element such as a diode D1 is connected between the output of error amplifier 70 and the inverting input 64 of sink error amplifier 58. Error amplifier 70 is designed to have high gain so that its output switches on very quickly. As a result, when the sensed voltage signal at its non-inverting input is less than the reference voltage at its inverting input, error amplifier 70 reverse biases diode D1 so that the voltage at the inverting input of sink error amplifier 58 is controlled by the clamp set point voltage and the feedback resistor R5. However, when the sensed voltage, and hence the amount of excess current flowing through clamp 26 gets too high, error amplifier 70 forward biases diode D1 such that any further increase in $I_{sink}$ is prevented. Any further increase in current sourced by motor-generator loads 20 causes the secondary bus voltage $V_{bus}$ to increase rapidly. This serves to force clamp circuits in the other converter modules to sink any additional current which may be generated by loads 20.

Figure 5:
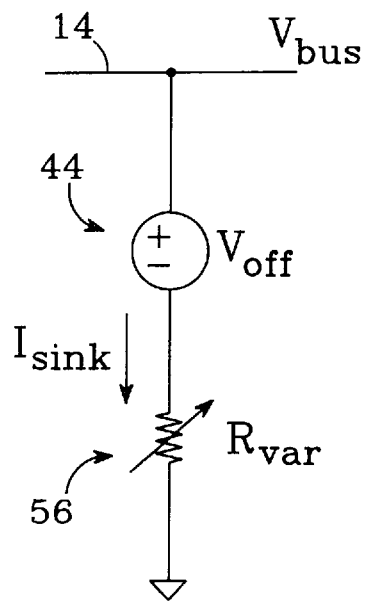
FIG. 5 is a schematic diagram of a circuit model for the fault protection and linear regulator clamp elements.

Although the primary function of fault protection clamp element 44 is to make clamp 26 single fault tolerant, the clamp element can also be used to distribute power dissipation between itself and the regulator clamp element 56. As illustrated in FIG. 5, this is accomplished by having fault protection clamp element 44, when activated, establish an offset voltage $V_{off}$ between the secondary bus 14 and the regulator clamp element, which is shown schematically as a variable resistance $R_{var}$. As a result, both the fault protection and regulator clamp elements dissipate power as the excess current flows from the secondary bus to ground. The offset voltage $V_{off}$ is preferably set at approximately one-half the secondary bus voltage so that the clamp elements share power dissipation approximately equally. This type of power sharing will improve the reliability and lifetime of the clamp element.

Figure 6:
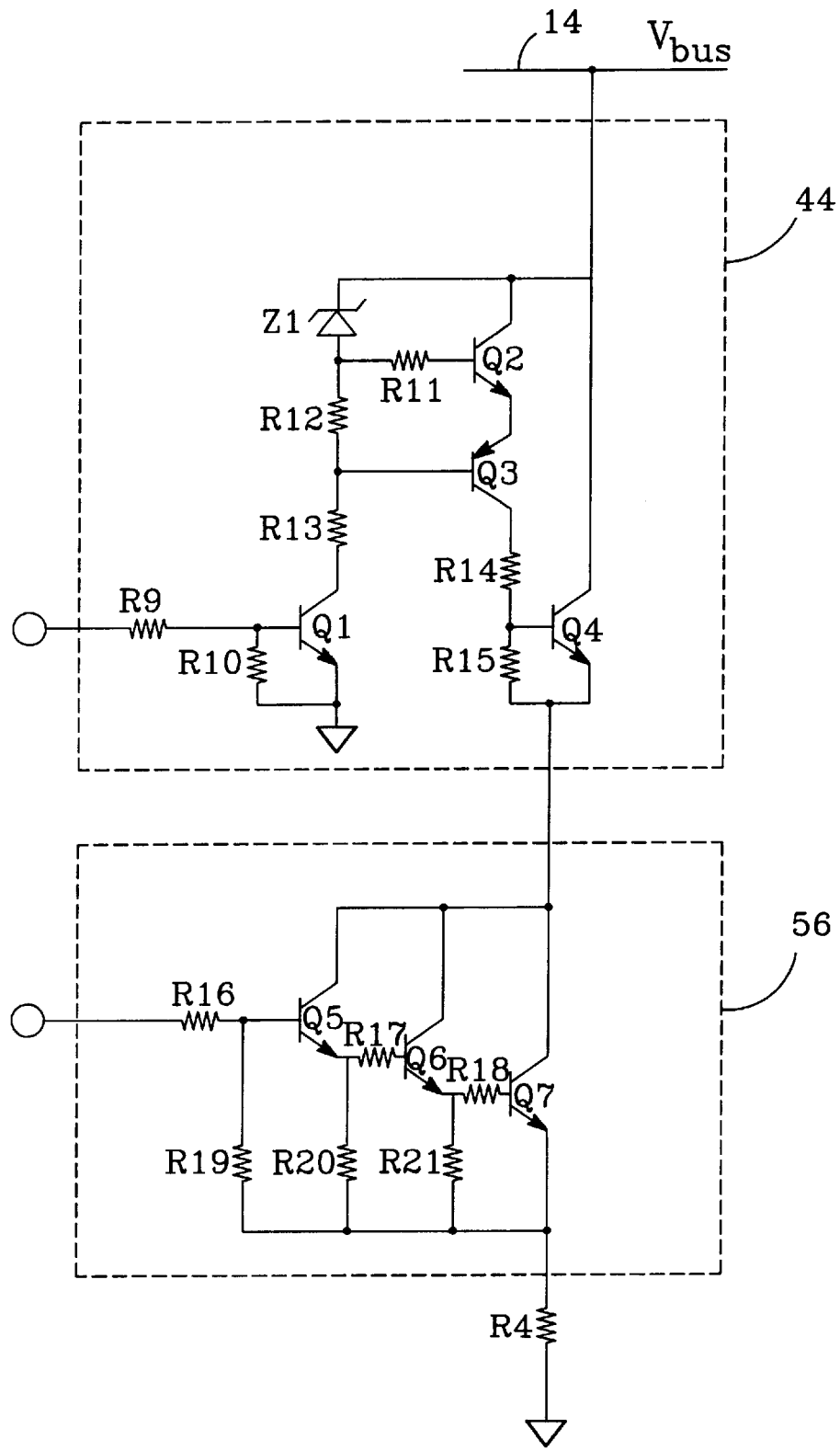
FIG. 6 is a schematic diagram of an embodiment of the fault protection and linear regulator clamp elements.

FIG. 6 illustrates a bipolar implementation of the fault protection and regulator clamp elements 44 and 56 shown in FIG. 3. Other bipolar topologies as well as FET configurations may be used. In this particular implementation, fault protection clamp element 44 includes a current limiting resistor R9 that is connected between comparator 46 shown in FIG. 3 and the base of a control transistor Q1 whose emitter is returned to ground. A resistor R10 is connected across Q1's base-emitter junction to prevent static charge from building up and forward biasing Q1 ON inadvertently. Transistor Q1 is normally OFF. However, when the converter's voltage control signal is less than the threshold voltage, the comparator forward biases transistor Q1 thereby pulling its collector voltage towards ground.

A zener diode Z1 is connected to the secondary bus voltage 14 and sets the bias voltage at the base of an npn driver transistor Q2 whose collector is tied to $V_{bus}$. A resistor R11 is connected between zener diode Z1 and Q2's base to prevent high frequency oscillation. A voltage divider, consisting of series connected resistors R12 and R13, is connected between the zener diode and Q1's collector to set the voltage at the base of a pnp driver transistor Q3 whose emitter is coupled to transistor $Q_2$'s emitter. An npn output transistor Q4 has a collector that is tied to the secondary bus, a base that is coupled through a resistor R14 that prevents high frequency oscillation to transistor Q3's collector, and an emitter that is coupled to the regulator clamp element 56. A resistor R15 is connected across Q4's base-emitter junction to prevent static charge from building up and forward biasing Q4 ON inadvertently.

Transistors Q2, Q3 and Q4 are normally OFF such that the resistance seen at the secondary bus looking into the fault protection clamp is on the order of megaohms. As a result, the clamp is effectively an open circuit and will not sink current. When the comparator forward biases transistor Q1, its collector current biases zener Z1 at is full potential and the voltage divider pulls the base voltage of transistor Q3 down driving it into saturation. This voltage drop between zener Z1 and the emitter of saturated transistor Q3, forward biases transistor. The current through transistors Q2 and Q3 forward biases load transistor Q4 so that it passes current from secondary bus 14 to regulator clamp element 56.

The offset voltage is equal to the sum of the zener voltage, transistor Q2's base-emitter voltage, saturated transistor Q3's collector-emitter voltage, and transistor Q4's base-emitter voltage. The base-emitter voltages are each approximately 0.7 V and the saturated collector-emitter voltage is approximately 0.2 V. The zener voltage is preferably selected so that the offset voltage is approximately one-half the bus voltage. For example, if the bus voltage is 30 V, a 13.4 V zener would set the voltage at the regulator clamp element at approximately 15 V.

Regulator clamp element 56 is a multi-stage current controlled current source. The number of stages depends on the required current gain and whether the system is used terrestrially or in spacecraft where radiation reduces the gain over time. Each stage includes an npn transistor (Q5,Q6,Q7) having a collector that is connected to the fault protection clamp element 44, a base that is connected through a current limiting resistor (R16,R17,R18) to the previous stage that also prevents high frequency oscillation, and an emitter that is connected to the next stage. A resistor (R19,R20,R21) is connected across the transistor's base-emitter junction to prevent static charge buildup.

When the clamp is disabled, the sink error amplifier holds the voltage at the base of the first stage transistor Q5 low thereby depriving it of any base current. This shuts off the current source so that the clamp element's apparent resistance is very large, theoretically infinite. When the clamp is enabled, the sink error amplifier increases the voltage thereby supplying base current to Q5. Each successive stage amplifies the base current by its current gain so that the collector current of the last stage dominates. This current is supplied by the secondary bus in the form of the excess load current and is returned to ground through sense resistor R4. The sink error amplifier drives transistor Q5 so that the amount of current demanded by the clamp element balances the excess load current. Because the voltage across the regulator clamp element is fixed, it looks like a variable resistor.

Figure 7:
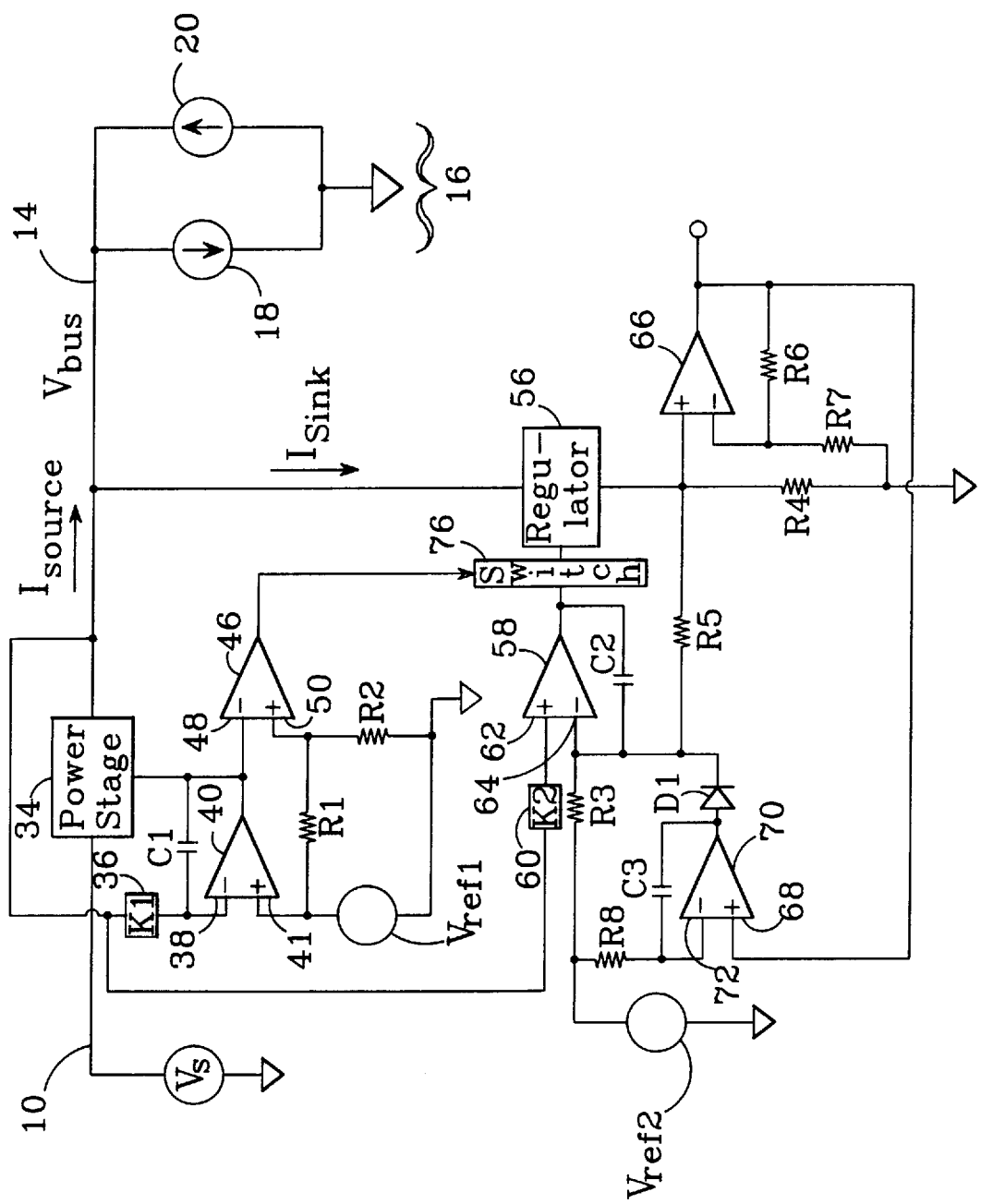
FIG. 7 is an alternate embodiment of the DC-to-DC converter.

Although single fault tolerance is an important feature, clamp 26 can be implemented without it. As shown in FIG. 7, the fault protection clamp element 44 shown in FIG. 3 has been replaced with a switch 76 that is connected between the sink error amplifier 58 and the regulator clamp element 56 to control the application of the sink error amplifier's voltage control voltage to the regulator clamp element. When the bus voltage error amplifier's voltage control signal $V_0$ is greater than the "knee" voltage 43 shown in FIG. 4, i.e. power stage 34 is sourcing current to the load 16, switch 76 opens thereby isolating the sink error amplifier 58 from regulator clamp element 56. As a result, regulator clamp element 56 is effectively an open circuit and will not sink current. Conversely, when the bus voltage error amplifier's voltage control signal is less than the threshold voltage $V_{TH}$, switch 76 closes thereby establishing the negative feedback loop that allows sink error amplifier 58 to set the resistance of regulator clamp element 56 to sink the excess current and regulate the secondary bus voltage. This embodiment has the additional disadvantage that regulator clamp element 56 dissipates all of the power in the module.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An output voltage clamp for use with a DC-to-DC converter to alternately source and sink current through a secondary bus to and from a plurality of motor-generator loads while regulating a secondary bus voltage $V_{bus}$, said clamp comprising:

a current regulator having a controllable resistance;

a sink error amplifier that senses the secondary bus voltage, compares it to a clamp setpoint voltage $V_{clamp}$, and, when $V_{bus} > V_{clamp}$, sets the current regulator's resistance to sink excess current sourced by the motor-generator loads and clamp said secondary bus voltage at said clamp setpoint voltage; and a control circuit that disables the current regulator when said DC-to-DC converter is sourcing current to prevent the current regulator from sinking current sourced by the DC-to-DC converter.

2. The output voltage clamp of claim 1, wherein said DC-to-DC converter senses the secondary bus voltage, compares it to a bus setpoint voltage, and generates a voltage control signal to control the amount of source current delivered to the motor-generator loads, said control circuit responding to said voltage control signal to enable or disable said current regulator.

3. The output voltage clamp of claim 2, wherein said control circuit comprises:

a comparator that switches between enable and disable states when said voltage control signal crosses a threshold; and

9 a switch that responds to said enable state by allowing said sink error amplifier to set the clamp circuit's resistance and sink excess current and responds to said disable state by disabling control of said current regulator so that its resistance approximates an open circuit that does not sink current.

4. The output voltage clamp of claim 2, wherein said control circuit comprises a comparator that switches between enable and disable states when said voltage control signal crosses a threshold, said current regulator comprising:

a fault-protection clamp element that is connected to said secondary bus and enabled or disabled by the state of said comparator; and a regulator clamp element that is controlled by said sink error amplifier to set its resistance and sink excess current when said fault-protection clamp element is enabled.

5. The output voltage clamp of claim 4, wherein said fault-protection clamp element establishes an offset voltage between said secondary bus and said regulator clamp element so that both clamp elements share power dissipation.

6. The output voltage clamp of claim 5, wherein said offset voltage is approximately one-half the secondary bus voltage so that said clamp elements share power dissipation approximately equally.

7. The output voltage clamp of claim 1, wherein said sink error amplifier has a non-inverting input that senses the secondary bus voltage and an inverting input that receives the clamp setpoint voltage, further comprising:

a current sense resistor that senses the amount of current flowing through said current regulator; and a feedback resistor that is connected between said current sense resistor and said sink error amplifier's inverting input, said feedback resistor increasing the voltage at the inverting input which increases the secondary bus voltage as the sink current through said current regulator increases, said increasing secondary bus voltage further activating other ones of a plurality of said output voltage clamps, which are connected in parallel to regulate the secondary bus, and whose clamp setpoint voltages may differ slightly.

8. The output voltage clamp of claim 1, wherein said secondary bus voltage increases with a slope that is a function of the resistance of the current sense and feedback resistors.

9. The output voltage clamp of claim 1, wherein said sink error amplifier has a non-inverting input that senses the secondary bus voltage and an inverting input that receives the clamp setpoint voltage, further comprising:

a current sense resistor that senses the amount of sink current flowing through said current regulator;

a voltage element connected to said sink error amplifier's inverting input that is normally off; and a limiting circuit that activates said voltage element when said sink current exceeds a clamp value, which causes said secondary bus voltage to increase rapidly with any further increase in sink current.

10. A voltage regulator for connection between a primary bus and a secondary bus that supplies a plurality of motor-generator loads, comprising:

a DC-to-DC converter that sources current to said secondary bus to establish a secondary bus voltage $V_{bus}$ when said motor-generator loads are collectively sinking current, said converter sensing said secondary bus voltage and comparing it to a bus setpoint voltage $V_{set}$ to generate a voltage control signal that controls the amount of source current thereby regulating said secondary bus voltage; and a clamp that is connected to said secondary bus, said clamp being disabled by said voltage control signal when said secondary bus voltage is less than said bus setpoint voltage so that all of said current generated by the DC-to-DC converter is delivered to the motor-generator loads and being enabled when said secondary bus voltage exceeds a clamp setpoint voltage, which is greater than said bus setpoint voltage, to sink the excess load current generated by the motor-generator loads and clamp said secondary bus voltage at said clamp setpoint voltage.

11. The voltage regulator of claim 10, wherein said clamp comprises:

a fault-protection clamp element that is connected to said secondary bus;

a comparator that switches between enable and disable states when said voltage control signal crosses a threshold to respectively activate and deactivate said fault-protection clamp element;

a regulator clamp element having a controllable resistance that is connected in series with said fault-protection clamp element; and a sink error amplifier that senses the secondary bus voltage, compares it to the clamp setpoint voltage and sets the regulator clamp element's resistance to sink excess current sourced by the motor-generator loads when said fault-protection clamp element is activated and clamp said secondary bus voltage at said clamp setpoint voltage.

12. The voltage regulator of claim 11, wherein said fault-protection clamp element establishes an offset voltage between said secondary bus and said regulator clamp element so that both clamp elements share power dissipation.

13. The output voltage clamp of claim 12, wherein said offset voltage is approximately one-half the secondary bus voltage so that said clamp elements share power dissipation approximately equally.

14. The output voltage clamp of claim 12, wherein said sink error amplifier has a non-inverting input that senses the secondary bus voltage and an inverting input that receives the clamp setpoint voltage, further comprising:

a current sense resistor that senses the amount of sink current flowing through said fault-protection and regulator clamp elements; and a feedback resistor that is connected between said current sense resistor and said sink error amplifier's inverting input, said feedback resistor increasing the voltage at the inverting input which increases the secondary bus voltage as the sink current through said clamp increases, said increasing secondary bus voltage further activating other ones of a plurality of said output voltage clamps, which are connected in parallel to regulate the secondary bus, and whose clamp setpoint voltages may differ slightly.

15. The output voltage clamp of claim 14, wherein said secondary bus voltage increases with a slope that is a function of the resistance of the current sensing and feedback resistors.

16. The output voltage clamp of claim 14, further comprising:

a voltage element connected to said sink error amplifier's inverting input that is normally off; and a limiting circuit that activates said voltage element when said sensed sink current exceeds a clamp value causing said secondary bus voltage to increase rapidly with any further increase in sink current.

17. A voltage regulated dual-bus architecture, comprising:

a primary bus for distributing a regulated primary bus voltage;

a plurality of motor-generator loads that are capable of collectively sinking or sourcing current;

a secondary bus for distributing a secondary bus voltage to said motor-generator loads;

a power stage connected between said primary and secondary buses for sourcing current to said motor-generator loads through said secondary bus and establish said secondary bus voltage;

a bus voltage error amplifier that senses said secondary bus voltage and compares it to a bus setpoint voltage to generate a voltage control signal that controls the amount of source current delivered to said loads to regulate said secondary bus voltage;

a fault-protection clamp element that is connected to said secondary bus;

a comparator that switches between enable and disable states when said voltage control signal crosses a threshold to respectively activate and deactivate said fault-protection clamp element when said secondary bus voltage respectively exceeds and is less than said bus setpoint voltage;

a regulator clamp element having a controllable resistance that is connected in series with said fault-protection clamp element; and a sink error amplifier that senses the secondary bus voltage, compares it to a clamp setpoint voltage and, when said fault-protection clamp element is activated, sets the regulator clamp element's resistance to sink excess current sourced by the motor-generator loads and clamps said secondary bus voltage at said clamp setpoint voltage.

18. The voltage regulator of claim 17, wherein said fault-protection clamp element establishes an offset voltage between said secondary bus and said regulator clamp element so that both clamp elements share power dissipation.

19. The output voltage clamp of claim 18, wherein said offset voltage is approximately one-half the secondary bus voltage so that said clamp elements share power dissipation approximately equally.

20. The output voltage clamp of claim 17, wherein said sink error amplifier has a non-inverting input that senses the secondary bus voltage and an inverting input that receives the clamp setpoint voltage, further comprising:

a current sense resistor that senses the amount of sink current flowing through said fault-protection and regulator clamp elements;

a voltage element connected to said sink error amplifier's inverting input that is normally off; and a limiting circuit that activates said voltage element when said sensed sink current exceeds a clamp value causing said clamp setpoint voltage and said secondary bus voltage to increase rapidly with any further increase in sink current.

21. The output voltage clamp of claim 20, further comprising:

a feedback resistor that is connected between said current sense resistor and said sink error amplifier's inverting input, said feedback resistor increasing the voltage at the inverting input which increases the secondary bus voltage as the sink current through said clamp increases, said increasing secondary bus voltage further activating other ones of a plurality of said output voltage clamps, which are connected in parallel to regulate the secondary bus, whose clamp setpoint voltages may differ slightly.

22. A voltage regulating system comprising a plurality of voltage converter modules connected in parallel between a primary bus and a secondary bus to selectively source and sink current to and from a plurality of motor-generator loads while regulating the secondary bus voltage $V_{bus}$, each said voltage convert module comprising:

a DC-to-DC converter that sources current to said secondary bus to establish the secondary bus voltage when said motor-generator loads are collectively sinking current, said converter sensing said secondary bus voltage and comparing it to a bus setpoint voltage $V_{set}$ to generate a voltage control signal that controls the amount of source current thereby regulating said secondary bus voltage;

a current regulator having a controllable resistance;

a sink error amplifier that senses the secondary bus voltage, compares it to a clamp setpoint voltage $V_{clamp}$ that may vary from module-to-module, and, when $V_{bus} > V_{clamp}$, sets the current regulator's resistance to sink excess current sourced by the motor-generator loads and clamp said secondary bus voltage at said clamp setpoint voltage;

a control circuit that disables the clamp circuit when said DC-to-DC converter is sourcing current to prevent the current regulator from sinking current sourced by the DC-to-DC converter;

a current sense resistor that senses the amount of current flowing through said clamp circuit; and a feedback resistor that is connected between said current sense resistor and said sink error amplifier to increase the secondary bus voltage as the current through said current sense resistor increases to further activate other ones of said modules to share the excess current produced by the motor-generator loads.

23. The output voltage clamp of claim 22, wherein said control circuit comprises a comparator that switches between enable and disable states when said voltage control signal crosses a threshold, said clamp circuit comprising:

a fault-protection clamp element that is connected to said secondary bus and enabled or disabled by the state of said comparator; and a regulator clamp element that is controlled by said sink error amplifier to set its resistance and sink excess current when said fault-protection clamp element is enabled.

24. The output voltage clamp of claim 23, wherein said fault-protection clamp element establishes an offset voltage between said secondary bus and said regulator clamp element so that both clamp elements share power dissipation.

25. The output voltage clamp of claim 24, wherein said offset voltage is approximately one-half the secondary bus voltage so that said clamp elements share power dissipation approximately equally.

26. The output voltage clamp of claim 23, wherein said sink error amplifier has a non-inverting input that senses the secondary bus voltage and an inverting input that receives the clamp setpoint voltage, further comprising:

a voltage element connected to said sink error amplifier's inverting input that is normally off; and a limiting circuit that activates said voltage element when the sink current through said current sense resistor exceeds a clamp value causing said clamp setpoint voltage and said secondary bus voltage to increase rapidly with any further increase in sink current.

* * * * *